(12) United States Patent
Hafeez

(10) Patent No.: US 8,358,631 B2
(45) Date of Patent: Jan. 22, 2013

(54) BEAMFORMING SYSTEMS AND METHOD

(75) Inventor: Abdulrauf Hafeez, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 980 days.

(21) Appl. No.: 12/406,489

(22) Filed: Mar. 18, 2009

(65) Prior Publication Data

US 2010/0056140 A1   Mar. 4, 2010

Related U.S. Application Data

(60) Provisional application No. 61/094,108, filed on Sep. 4, 2008.

(51) Int. Cl.
*H04W 4/00* (2009.01)
*H04H 20/67* (2008.01)
*H04B 7/00* (2006.01)
*H04K 1/10* (2006.01)

(52) U.S. Cl. ..... 370/332; 370/328; 370/339; 370/310.2; 375/260; 455/434

(58) Field of Classification Search ............... None
See application file for complete search history.

(56) References Cited

OTHER PUBLICATIONS

Boche H et al, Solution of the Multiuser Downlink Beamforming Problem With Individual SINR Contraints, Jan. 1, 2004. IEEE Transactions on Vehicular Technology, vol. 53 No. 1, Piscataway, NJ.

*Primary Examiner* — Phirin Sam
*Assistant Examiner* — Sori Aga

(57) ABSTRACT

A downlink multi-user beamforming scheme for a network of coordinated transmission points where the beamforming weights and power allocation are determined to maximize a jointly-achievable SINR margin under per-transmitter power constraints and the constraint that each data stream is transmitted from a single transmission point.

23 Claims, 4 Drawing Sheets

BEAMFORMING SYSTEMS AND METHOD

This application claims the benefit of U.S. Provisional Pat. App. No. 61/094,108, filed on Sep. 4, 2008, which is incorporated herein by this reference.

TECHNICAL FIELD

The present invention relates to wireless communication systems. More specifically, the present invention relates to beamforming systems and methods.

BACKGROUND

Multi-user multiple-input multiple-output (MIMO) transmission using a Grid-of-Beams (GoB) approach has been shown to be an attractive scheme for the downlink for emerging wireless systems. See e.g., IST-4-027756 WINNER II Deliverable D4.7.3, "Smart antenna based interference mitigation," June 2007. In the GoB scheme, a grid of beams is created by using closely-spaced antennas at the base stations. Independent data streams are transmitted to terminals in geographical locations served by non-overlapping beams. A hallmark of this scheme is that it requires very little channel state information at the transmitter (CSIT), i.e. beam selection.

The grid of beams approach relies on fixed beams. Beams can be steered by means of baseband signal processing, providing improved coverage and less interference. The problem of joint adaptive beamforming from a multi-antenna base station to multiple single-antenna terminals has been solved. See e.g., M. Schubert and H. Boche, "Solution of the multi-user beamforming problem with individual SINR constraints," IEEE Trans. VT, vol. 53, no. 1, January 2004 ("Schubert"). The beamformers and transmission powers are jointly adjusted to fulfill individual signal-to-interference-plus-noise ratio (SINR) requirements at the terminals. An algorithm is derived that maximizes the jointly-achievable SINR margin (over the SINR requirements) under sum transmission power constraint. A second algorithm is also derived that minimizes the sum transmission power while satisfying the set of SINR requirements. The algorithms require statistical information about the channel models at the transmitter.

A distributed antenna system (DAS) architecture is being considered for IMT-Advanced systems. DAS differs from a conventional cellular architecture in that DAS cells are connected to a central processing unit (CPU) by means of a fast backhaul. Compared to a conventional cellular network, very high spectral efficiency is possible in a DAS network due to coherently-coordinated transmission from DAS cells in the downlink and joint reception at DAS cells in the uplink. However, coherently-coordinated transmission from DAS cells generally requires a large amount of CSIT which overburdens spectral resources.

A solution to this problem has been suggested where an approach similar to the multi-user beamforming approach of Schubert has been adapted for a DAS network with multi-antenna transmission points (TP). The scheme only requires statistical information about the channel models at the TPs.

In the suggested solution, the beamformers and transmission powers are iteratively determined to minimize the sum transmission power while fulfilling the SINR requirements. A problem with this approach is that the feasibility of the solution is not verified beforehand. Due to this, the iterative algorithm may result in an infeasible power allocation and may not converge. This problem has been addressed in Schubert by: first, finding the beamformers and power allocation that maximize the jointly-achievable SINR margin under sum transmission power constraint; second, determining if the SINR requirements are jointly achievable (SINR margin greater than unity); and third, finding the beamformers and power allocation that minimize the sum transmission power while fulfilling the SINR requirements. The solution that minimizes the sum transmission power can be used in a DAS network if the maximum transmission power is less than the corresponding individual power constraint. On the other hand, if the maximum transmission power is higher than the individual power constraint, the solution is considered infeasible.

A problem with the solution suggested in Schubert is that the sum transmission power constraint, although suitable for single-cell transmission, is not very suitable for multi-cell transmission in a DAS network as each TP antenna is individually power-limited. The maximum jointly-achievable SINR margin obtained under sum power constraint is not meaningful for a DAS network.

SUMMARY

In one aspect, the invention provides a downlink multiuser beamforming scheme for a network of coordinated transmission points where the beamforming weights and power allocation are determined to maximize a jointly-achievable SINR margin under per-transmitter power constraints and the constraint that each data stream is transmitted from a single transmission point. The SINR margin can be used to set appropriate transmission rates that can be achieved jointly in a network of coordinated transmission points.

More specifically, in one aspect, the invention provides a method performed by a controller for determining a beam forming vector for use in transmitting data from a transmission point to a first mobile device connected to the transmission point.

In some embodiments, this method includes the following steps: (A) determining a first set of beam forming vectors (e.g., by using equation 20, defined below, and an initial (first) set of virtual dual uplink transmit powers), the first set of beam forming vectors comprising a first beam forming vector for the first mobile device and a first beam forming vector for a second mobile device; (B) determining a first set of downlink transmit powers and a first maximum worst-case signal to interference-plus-noise ratio (SINR) margin using the first set of beam forming vectors, the first set of downlink transmit powers comprising a first downlink transmit power for the first mobile device and a first downlink transmit power for the second mobile device; (C) determining a second set of virtual dual uplink transmit powers using the first maximum worst-case SINR margin (e.g., using the first maximum worst-case SINR margin in solving Equation 19 (defined below)), the second set of virtual dual uplink transmit powers comprising a second virtual dual uplink transmit power for the first mobile device and a second virtual dual uplink transmit power for the second mobile device; (D) determining a second set of beam forming vectors using the second set of virtual dual uplink transmit powers, the second set of beam forming vectors comprising a second beam forming vector for the first mobile device and a second beam forming vector for the second mobile device; (E) determining a second set of downlink transmit powers and a second maximum worst-case SINR margin using the second set of beam forming vectors, the second set of downlink transmit powers comprising a second downlink transmit power for the first mobile device and a second downlink transmit power for the second mobile device; (F) determining whether the maximum worst-case SINR margin has converged using the first maximum worst-case SINR margin and the second maximum worst-case SINR margin; and (G) in response to determining in step (F) that the maximum worst-case SINR margin has converged, then using the second beam forming vector for the first mobile device to transmit the data to the first mobile device.

Steps (A)-(G) may be performed periodically while the first mobile terminal is connected to a transmission point controlled by the said controller.

In some embodiments, the step of determining whether the maximum worst-case SINR margin has converged comprises dividing the second maximum worst-case SINR margin by the first maximum worst-case SINR margin and determining whether the result is less than or equal to a predetermined threshold.

In some embodiments, the method also includes: (i) determining a third set of virtual dual uplink transmit powers using the second maximum worst-case SINR margin; (ii) determining a third set of beam forming vectors using the third set of uplink transmit powers; (iii) determining a third set of downlink transmit powers and a third maximum worst-case SINR margin using the third set of beam forming vectors; and (iv) determining whether the maximum worst-case SINR margin has, converged using the second maximum worst-case SINR margin and the third maximum worst-case SINR margin, wherein steps (i)-(iv) are performed in response to determining in step (F) that the maximum worst-case SINR margin has not converged.

In some embodiments, the step of determining the first set of downlink transmit powers and the first maximum worst-case signal SINR margin comprises: (i) assuming that a particular transmission point controlled by the controller transmits at a maximum power allowed under a per-transmitter power constraint (PTPC); (ii) using the assumption and the first set of beam forming vectors to determine a set of downlink transmit powers; (iii) using the determined set of downlink transmit powers to determine whether the PTPC is satisfied; and (iv) setting the first set of downlink transmit powers to the determined set of downlink transmit powers if it is determined that the PTPC is satisfied, otherwise assuming that a different transmission point controlled by the controller transmits at a maximum power allowed under the PTPC and repeating steps (ii)-(iv). In some embodiments, step (ii) comprises solving Equation 12 (defined below).

In some embodiments, the step of determining the maximum worst-case SINR margin comprises using predetermined target SINR values to solve Equation 3.

In some embodiments, the method also includes: receiving from the transmission point (1) signal information pertaining to a transmit correlation matrix associated with the first mobile device (e.g., the transmit correlation matrix itself or comprises information from which the transmit correlation matrix can be derived), (2) the noise information, and (3) the interference information, wherein the interference information pertains to a transmit correlation matrix of at least one second mobile device connected to the transmission point, and the step of determining the first set of beam forming vectors comprises using the signal information, noise information and interference information to determine the first set of beam forming vectors.

In some embodiments, the first and second beam forming vectors are constrained to be zero for all but one transmission point.

In another aspect, the present invention provides a controller for determining a beam forming vector for use in transmitting data to a first mobile device connected to an transmission point. In some embodiments, the controller includes: a transmitter and receiver for communicating with the transmission point; a data storage system storing software; and a data processing system for executing the software, and the software comprises: (A) computer instructions for determining a first set of beam forming vectors using a first set of virtual dual uplink transmit powers, wherein the first set of beam forming vectors comprises a first beam forming vector for the first mobile device and a first beam forming vector for a second mobile device; (B) computer instructions for determining a first set of downlink transmit powers and a first maximum worst-case signal to interference-plus-noise ratio (SINR) margin using the first set of beam forming vectors, wherein the first set of downlink transmit powers comprises a first downlink transmit power for the first mobile device and a first downlink transmit power for the second mobile device; (C) computer instructions for determining a second set of virtual dual up ink transmit powers using the first maximum worst-case SINR margin, wherein the first set of virtual dual uplink transmit powers comprises a first virtual dual uplink transmit power for the first mobile device and a first virtual dual uplink transmit power for the second mobile device; (D) computer instructions for determining a second set of beam forming vectors using the second set of virtual dual uplink transmit powers, wherein the second set of beam forming vectors comprises a second beam forming vector for the first mobile device and a second beam forming vector for the second mobile device; (E) computer instructions for determining a second set of downlink transmit powers and a second maximum worst-case SINR margin using the second set of beam forming vectors, wherein the second set of downlink transmit powers comprises a second downlink transmit power for the first mobile device and a second downlink transmit power for the second mobile device; and (F) computer instructions for determining whether the maximum worst-case SINR margin has converged using the first maximum worst-case SINR margin and the second maximum worst-case SINR margin.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
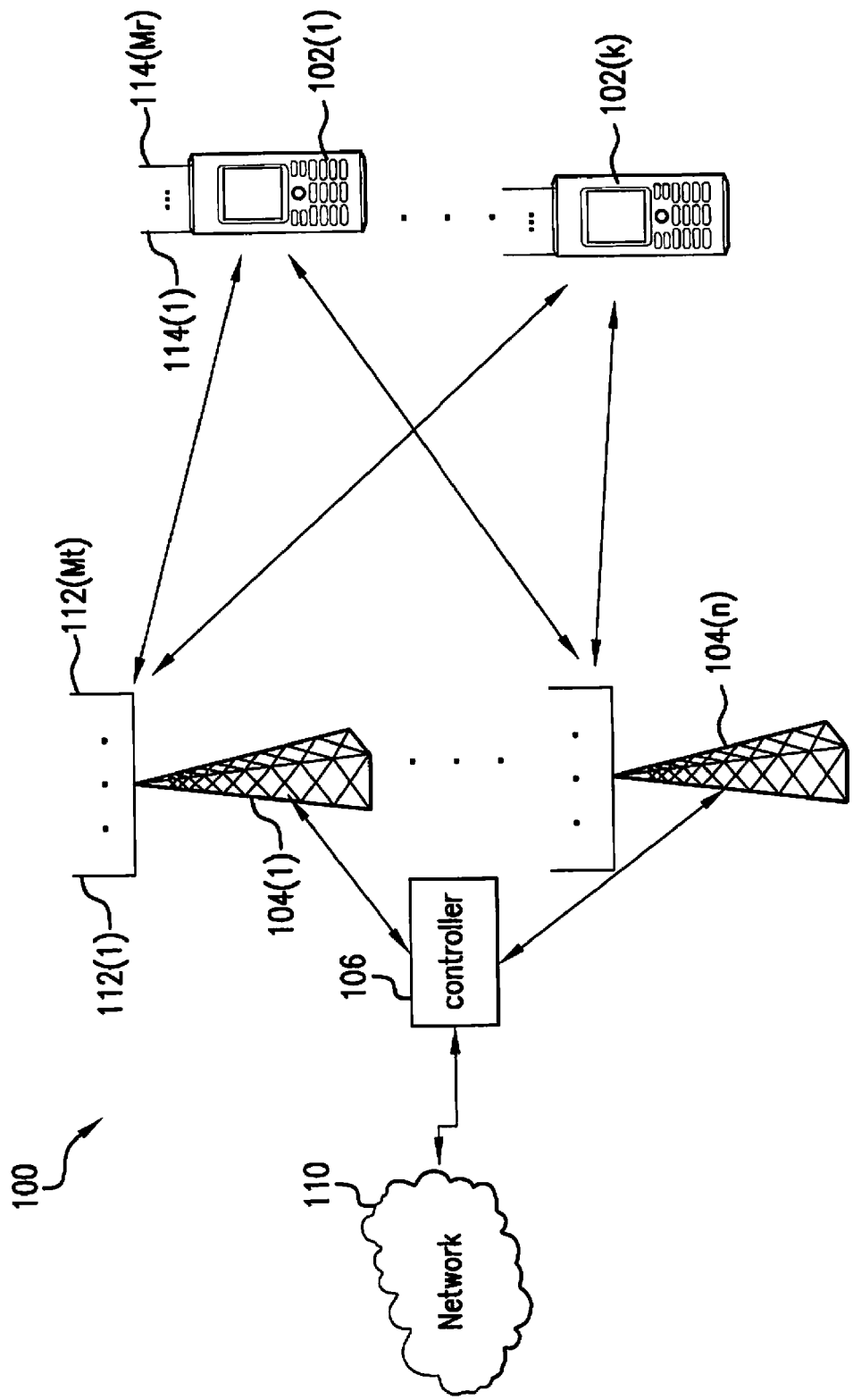
FIG. 1 illustrates a system according to an embodiment of the invention.

Referring now to FIG. 1, FIG. 1 illustrates a wireless communication system 100 with N transmission points (TPs) 104 and K mobile devices 102 (a.k.a., user equipments 102). Each TP has $M_t$ transmit antennas 112 and each user equipment (UE) has $M_r$ receive antennas 114. In some embodiments, however, each TP has a single omni-directional antenna, a single sector antenna or a single antenna array.

Let the $M_r \times M_t$ matrix $H_{i,n}$ represent the frequency-non-selective fading channel between UE i and TP n. The $M_r \times NM_t$ matrix $H_i = [H_{i,1}\ H_{i,2} \ldots H_{i,N}]$ represents the channel between UE i and all TPs. The downlink baseband signal model is given by $$y_i = H_i \underline{x} + w_i \qquad \text{Eq. (1)}$$

where $\underline{x}$ is an $NM_t \times 1$ vector representing the signal transmitted from the transmit antennas of all TPs and $w_i$ is a sample of additive white Gaussian noise with covariance matrix $\sigma_i^2 I$. The transmitted signal $\underline{x}$ is given by $$\underline{x} = \sum_{i=1}^{K} \underline{x}_i = \sum_{i=1}^{K} \sqrt{p_i}\, \underline{u}_i s_i$$

where $s_i$ is a modulation symbol (drawn from a unit-variance symbol alphabet) which is transmitted to UE i using a beamformer or precoder $\underline{u}_i$ and using power $p_i$. We assume that the signal for each UE is transmitted from a single TP. The beamforming vector is normalized to have unit power $$E[\underline{u}_i^H \underline{u}_i] = 1 \text{ for } i = 1, 2, \ldots, K.$$

The TPs are separated by large distances (much greater than the signal wavelength) therefore their antennas are mutually uncorrelated. The transmit channel covariance matrix for UE i is given by $$R_i = E[H_i^H H_i] = \text{diag}(R_{i,1}, R_{i,2}, \ldots, R_{i,N}),$$

where $R_{i,n}$ is the covariance matrix of the channel between TP n and UE i, defined as $$R_{i,n} = E[H_{i,n}^H H_{i,n}].$$

Assuming that UE i knows its instantaneous channel matrix $H_i$ and employs maximum ratio combining (MRC) at the receiver, its downlink SINR is given by $$SINR_i^{DL}(U, \underline{p}) = \frac{p_i \underline{u}_i^H R_i \underline{u}_i}{\sum_{k=1,k\neq i}^{K} p_k \underline{u}_k^H R_i \underline{u}_k + \sigma_i^2} \qquad \text{Eq. (2)}$$

where U is the matrix of beamformers, given by $$U = [\underline{u}_1, \underline{u}_2, \underline{u}_K]$$

and $\underline{p}$ is the vector of downlink transmit powers, given by $$\underline{p} = [p_1, p_2, \ldots, p_K].$$

Problem Statement

If we let $\gamma_i$ be the target SINR for UE i, for $i = 1, 2, \ldots, K$ and define $SINR_i^{DL}/\gamma_i$ as the SINR margin for UE i, the target SINRs for all UEs can be achieved if the worst-case SINR margin is greater than unity.

Consider maximizing the worst-case SINR margin over all possible beamformers and transmit powers under per-transmitter power constraints (PTPC), i.e. find $$C^{DL} = \max_{U, \underline{p}} \min_{1 \leq i \leq K} \frac{SINR_i^{DL}(U, \underline{p})}{\gamma_i} \qquad \text{Eq. (3)}$$

s.t. $p_n^{AP} = \sum_{i \in S_n} p_i \leq P_{max}$ \qquad Eq. (4)

$\forall n = 1, 2, \ldots N$ where $C^{DL}$ is the maximum worst-case SINR margin, $S_n$ is the set of UEs connected (e.g., wirelessly connected) to TP n, $p_n^{AP}$ is the total transmit power for TP n and $P_{max}$ is the maximum transmit power per TP.

Downlink Power Allocation

Given a fixed beamformer matrix $$\tilde{U} = [\underline{\tilde{u}}_1, \underline{\tilde{u}}_2, \ldots, \underline{\tilde{u}}_K],$$

we find a downlink power allocation that maximizes the worst-case SINR margin.

Let $\underline{\tilde{p}}$ be a transmit power vector with the minimum L1 norm (or sum power) $\|\underline{\tilde{p}}\|$ that maximizes the worst-case SINR margin while satisfying PTPC. Then it can be shown that:

$$C^{DL}(\tilde{U}) = \frac{SINR_i^{DL}(\tilde{U}, \underline{\tilde{p}})}{\gamma_i} \text{ for } i = 1, 2, \ldots, K \qquad \text{Eq. (5)}$$

and $$\tilde{p}_n^{AP} = P_{max} \text{ for some } n = n_0 \qquad \text{Eq. (6)}$$

(i.e. the same SINR margin is achieved by all UEs and the margin is achieved by having at least one TP transmit at the maximum power).

Equation Eq. (5) can be written in matrix notation as $$\underline{\tilde{p}} C^{DL}(\tilde{U})^{-1} = D(\tilde{U}) \Psi(\tilde{U}) \underline{\tilde{p}} + D(\tilde{U}) \underline{\sigma} \qquad \text{Eq. (7)}$$

where $\Psi(U)$ is a matrix with elements given by $$\{\Psi(U)\}_{i,k} = \begin{cases} \underline{u}_k^H R_i \underline{u}_k & i \neq k \\ 0 & i = k, \end{cases} \qquad \text{Eq. (8)}$$

$$D(U) = \text{Diag}\left\{ \frac{\gamma_1}{\underline{u}_1^H R_1 \underline{u}_1}, \frac{\gamma_2}{\underline{u}_2^H R_2 \underline{u}_2}, \ldots, \frac{\gamma_K}{\underline{u}_K^H R_K \underline{u}_K} \right\}, \qquad \text{Eq. (9)}$$

and $$\underline{\sigma} = [\sigma_1^2, \sigma_2^2, \ldots, \sigma_K^2]^T. \qquad \text{Eq. (10)}$$

Assuming that $n_0$ is known a priori, then using equation Eq. (6) in Eq. (7) we get $$P_{max} C^{DL}(\tilde{U})^{-1} = \underline{1}_{n_0}^T D(\tilde{U}) \Psi(\tilde{U}) \underline{\tilde{p}} + \underline{1}_{n_0}^T D(\tilde{U}) \underline{\sigma} \qquad \text{Eq. (11)}$$

where $\underline{1}_{n_0}$ is a $K \times 1$ vector with ones in positions $i \in S_{n_0}$ and zeros in all other positions. Equations Eq. (7) and Eq. (11) can be combined into the set of equations:

$$\Phi(\tilde{U}, n_0)\tilde{p}_{ext} = C^{DL}(\tilde{U})^{-1}\tilde{p}_{ext} \qquad \text{Eq. (12)}$$

where $$\Phi(U, n) = \begin{bmatrix} D(U)\Psi(U) & D(U)\underline{\sigma} \\ 1_n^T D(U)\Psi(U)/P_{max} & 1_n^T D(U)\underline{\sigma}/P_{max} \end{bmatrix} \qquad \text{Eq. (13)}$$

and $\tilde{p}_{ext}$ is a (K+1)×1 vector, given by $$\tilde{p}_{ext} = \begin{bmatrix} \tilde{p} \\ 1 \end{bmatrix}.$$

From Eq. 12, it can be observed that the SINR margin $C^{DL}(\tilde{U})$ is a reciprocal eigen-value of the non-negative matrix $\Phi(\tilde{U}, n_0)$ with $\tilde{p}_{ext}$ as the corresponding eigen-vector such that $$\{\tilde{p}_{ext}\}_{K+1} = 1.$$

It can be shown that the maximum eigen-value and its associated eigen-vector are strictly positive and correspond to the inverse SINR margin and the optimum power allocation, respectively. Note that the SINR targets are achievable only if the maximum eigen-value is less than or equal to 1.

TP with Maximum Transmit Power

In the derivation given above, it was assumed that the TP ($n_0$) transmitting at the maximum allowed power ($P_{max}$) is known. In practice $n_0$ can be found as follows. Solve the power allocation problem in (12) for $\hat{n}_0 \in \{1, 2, \ldots N\}$ where $\hat{n}_0$ is a hypothetical (i.e., assumed) value of $n_0$, until a value is found for which the power allocation satisfies PTPC Eq. (4). It can be shown that PTPC can be satisfied for only one value of $\hat{n}_0$, unless two or more values result in the same power allocation vector.

Beamformers

In the above derivation, it was assumed that the beamformers ($\hat{U}$) are known a priori. The beamformers can be found by considering a virtual dual uplink multiple access channel (MAC) which is the dual of the downlink channel given by (1). The system model (received signal) for the dual uplink MAC for UE i is given by $$\underline{y}_i^{UL} = H_i^H \underline{x}_i^{UL} + \underline{w}^{UL} \qquad \text{Eq. (14)}$$

where $w^{UL}$ is a zero-mean additive white Gaussian noise (AWGN) process with identity covariance matrix and $\underline{x}_i^{UL}$ is the signal transmitted from UE i, given by $$\underline{x}_i^{UL} = (\sqrt{q_i/\sigma_i^2})[S_{i,1}^{UL}, S_{i,2}^{UL}, \ldots, S_{i,M_1}^{UL}]^T \qquad \text{Eq. (15)}$$

where $q_i$ is the transmit power of UE i. Assuming that the linear filter $u_i$ is used at the TPs to detect the symbols transmitted by UE i, the SINR for UE i for the dual uplink MAC is given by $$SINR_i^{UL}(U, \underline{q}) = \frac{q_i \underline{u}_i^H R_i' \underline{u}_i}{\sum_{k \neq i} q_k \underline{u}_i^H R_k' \underline{u}_i + 1} \qquad \text{Eq. (16)}$$

where

-continued $$R_i' = R_i/\sigma_i^2. \qquad \text{Eq. (17)}$$

It can be shown that the downlink and the virtual dual uplink MAC have the same SINR achievable regions. Thus, given downlink SINR targets $\gamma_i$, i=1, 2, . . . , K and downlink SINR margin $C^{DL}(\tilde{U})$ achieved by means of downlink power allocation $\tilde{p}$ and beamforming vectors $\tilde{U}$, there exists a power allocation $\tilde{q}$ for the dual uplink MAC with sum power $$\|\tilde{q}\| = \|\tilde{p}\|$$

such that $$SINR_i^{UL}(\tilde{U}) = \gamma_i C^{DL}(\tilde{U}), \text{ for } i=1,2,\ldots K \qquad \text{Eq. (18)}$$

(i.e., the same SINRs are achieved in the dual uplink MAC). Substituting the above equations in (16) and simplifying, the uplink power allocation $\tilde{q}$ can be obtained as $$\tilde{q} = Diag(\underline{\sigma})(C^{DL}(\tilde{U})^{-1}D(\tilde{U})^{-1} - \Psi^T(\tilde{U}))^{-1}\underline{1}. \qquad \text{Eq. (19)}$$

where 1 is a column vector of ones.

The SINR targets are achieved in both links by the same beamforming vectors/receive filters. Thus, the solution of the downlink beamforming problem can be obtained by solving the uplink filtering problem.

For a given uplink power allocation $\tilde{q}$, the optimal unit-norm receive filters maximizing (16) are given by $$\tilde{u}_i = \frac{e_{max}(R_i', Q_i(\tilde{q}))}{\|e_{max}(R_i', Q_i(\tilde{q}))\|}, 1 \leq i \leq K \qquad \text{Eq. (20)}$$

where $e_{max}(A,B)$ is the generalized eigen-vector of the matrices A and B corresponding to the largest eigen-value, and $$Q_i(\tilde{q}) = \sum_{k=1, k \neq i}^{K} \tilde{q}_k R_k' + I. \qquad \text{Eq. (21)}$$

Figure 2:
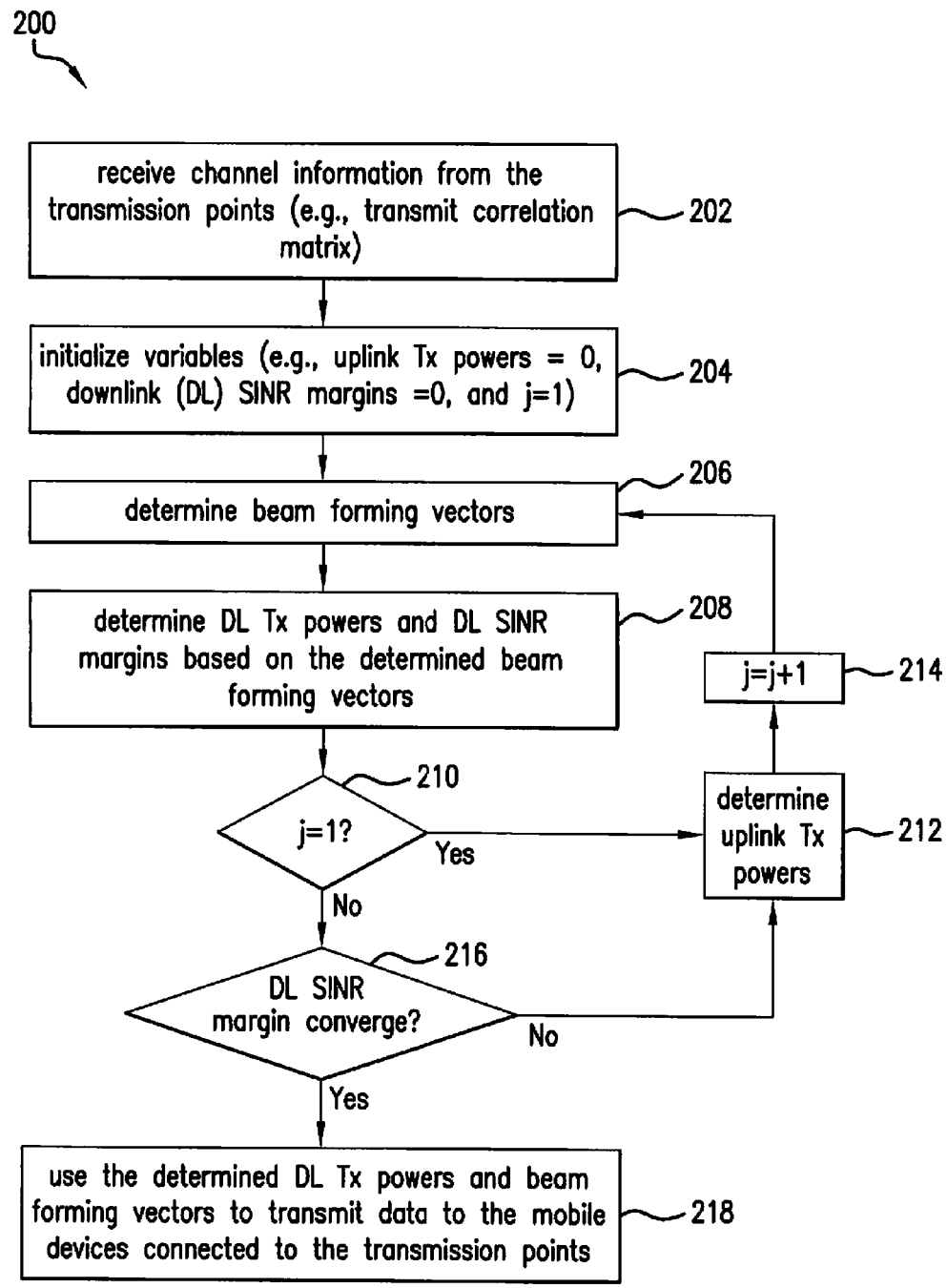
FIG. 2 is a flow chart illustrating a process according to some embodiments of the invention

Referring now to FIG. 2, FIG. 2 is a flow chart illustrating a process 200, according to some embodiments, for determining a beam forming vector for use in transmitting data from a TP 104 (e.g., TP 104(a)) to a UE 102 (e.g., UE 102(a)) connected to the TP 104. A controller 106 (see FIG. 1), which is in communication with TPs 104, may perform process 200.

Process 200 begins in step 202, where controller 106 receives channel information from the TP 104. For example, in step 202 controller 106 may receive from the TP 104 the following information: (1) signal information pertaining to a transmit correlation matrix associated with the UE 102, (2) noise information, and (3) interference information pertaining to a transmit correlation matrix associated with at least one other UE using the TP 104 (e.g., UE 102(b)). The signal information includes a transmit correlation matrix or information from which controller 106 can derive the transmit correlation matrix.

In step 204, controller 106 initializes one or more variables. For example, in step 204 controller 106 may initialize a set of variables representing a set of uplink (UL) transmit (Tx) powers, a variable representing a worst-case signal-to-interference-plus-noise ratio (SINR) margin, and a counter variable (j) (e.g., j may be set to a value of 1).

In step 206, controller 106 determines a set of beam forming vector using the signal information, noise information, interference information, and the set of UL Tx powers. For example, in step 206, controller 106 determines the beam forming vector using equation 20.

In step 208, controller 106 determines a set of DL Tx powers and a worst-case SINR margin using the set of beam forming vectors determined in step 206.

In step 210, controller determines the value of j and determines whether j is set to a value of 1. If it is, controller 106 proceeds to step 212, otherwise controller proceeds to step 216.

In step 212, controller 106 updates the variables representing the UL Tx powers using the maximum worst-case SINR margin determined in step 208. For example, in step 206, controller 106 updates the variables representing the UL Tx powers using equation 19.

In step 214, j is incremented. After step 214, controller repeats steps 206-208. That is, controller (a) determines a new set of beam forming vectors using, among other things, the variables representing the UL Tx powers, which were updated in step 212, and (b) determines a new set of DL Tx powers and a new maximum worst-case SINR margin using the newly determined beam forming vectors.

In step 216, controller 106 determines whether the maximum worst-case SINR margin has converged. For example, if we let $C^{DL}(j)$ equal the most recently determined maximum worst-case SINR margin and we let $C^{DL}(j-1)$ equal the previous maximum worst-case SINR margin that was determined in step 208, then, in step 216, controller 106 determines whether the maximum worst-case SINR margin has converged by dividing $C^{DL}(j)$ by $C^{DL}(j-1)$ and determining whether the result is less than or equal to a predetermined threshold. The predetermined threshold may be set equal to 1+ε. If in step 216 controller 106 determines that the maximum worst-case SINR margin has not converged, then process 200 proceeds back to step 212, otherwise it proceeds to step 218.

In step 218, the newly a determined DL Tx power and beam forming vector for UE 102(a) are used to transmit data to UE 102(a).

Figure 3:
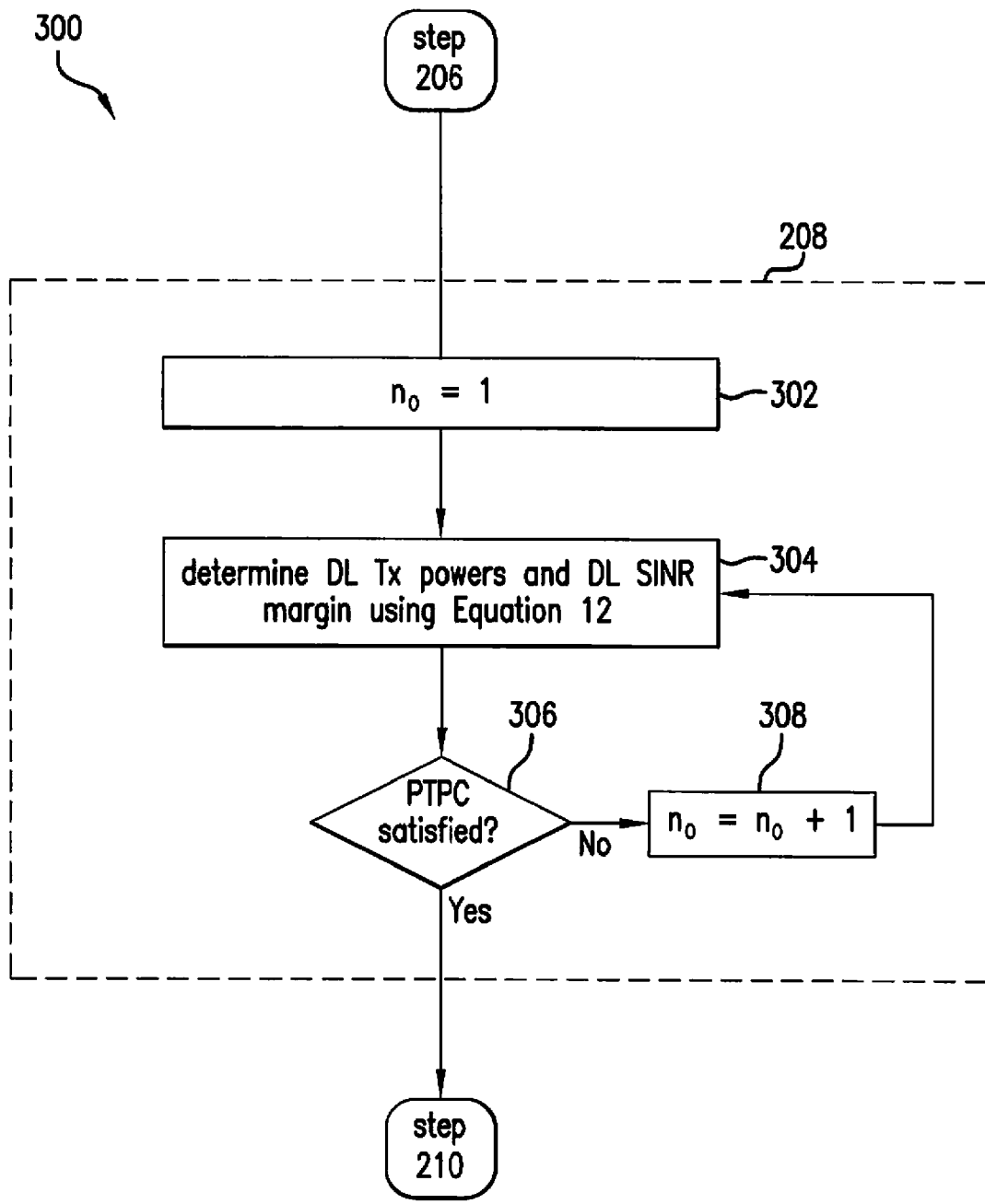
FIG. 3 is a flow chart illustrating a process according to some embodiments of the invention.

Referring now to FIG. 3, FIG. 3 is a flow chart illustrating an iterative process 300, according to some embodiments, for performing step 208. Process 300 may begin in step 302, where controller 106 initializes a variable $n_0$. For example, in step 302 $n_0$ may be set to a value of 1. In step 304, controller 106 uses $n_0$ and the most recent set of beam forming vectors determined as a result of performing step 206 to determine a set of downlink transmit powers. For example, in step 304, controller 106 determines the set of downlink transmit powers using equation 12, $n_0$ and the set of beam forming vectors.

In step 306, controller 106 uses the determined set of downlink transmit powers to determine whether a per-transmitter power constraint (PTPC) is satisfied. For example, in step 306, controller 106 determines whether equation (4) is true. If the PTPC is satisfied, process 300 ends, otherwise process 300 proceeds to step 308. In step 308, $n_0$ is incremented (i.e., $n_0 = n_0 + 1$). After step 308, process 30C returns to step 304.

Figure 4:
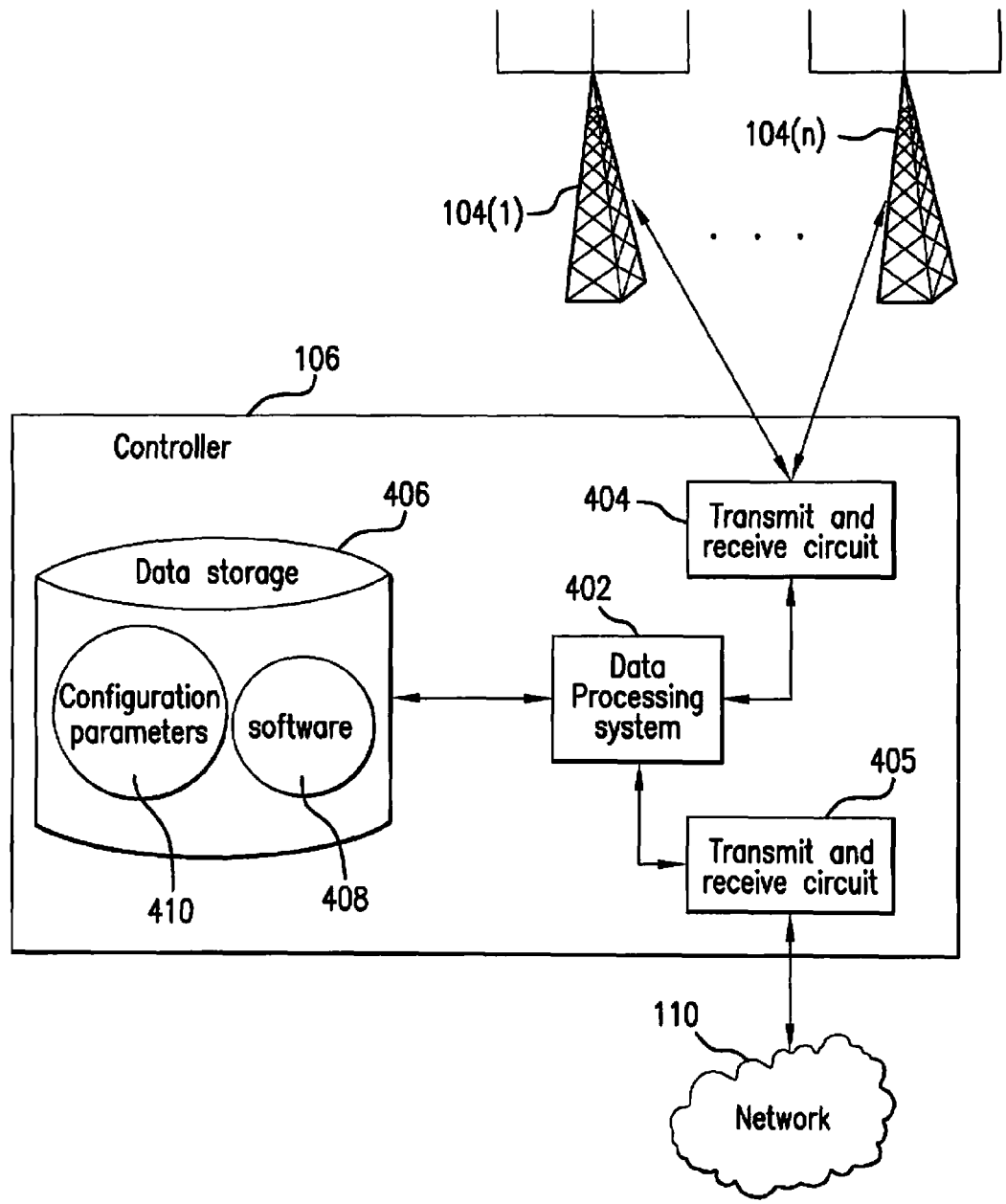
FIG. 4 is a functional block diagram of a controller according to some embodiments of the invention.

Referring now to FIG. 4, FIG. 4 is a functional block diagram of controller 106 according to some embodiments of the invention. As shown, controller 106 may comprise a data processing system 402 (e.g., one or more microprocessors), a data storage system 405 (e.g., one or more non-volatile storage devices) and computer software 408 stored on the storage system 406. Configuration parameters 410 may also be stored in storage system 406. Controller 106 also includes transmit/receive (Tx/Rx) circuitry 404 for transmitting data to and receiving data from TPs 104 and transmit/receive (Tx/Rx) circuitry 405 for transmitting data to and receiving data from, for example, network 110. Software 408 is configured such that when processor 402 executes software 408, controller 106 performs steps described above (e.g., steps described above with reference to the flow charts). For example, software 408 may include: (1) computer instructions for.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method performed by a controller for determining a beam forming vector for use in transmitting data from a transmission point to a first mobile device connected to the transmission point, comprising:

(A) determining a first set of beam forming vectors using a first set of virtual dual uplink transmit powers, wherein the first set of beam forming vectors comprises a first beam forming vector for the first mobile device and a first beam forming vector for a second mobile device;

(B) determining a first set of downlink transmit powers and a first maximum worst-case signal to interference-plus-noise ratio (SINR) margin defined by $$C^{DL} = \max_{U,\underline{p}} \min_{1 \le i \le K} \frac{\text{SINR}_i^{DL}(U, \underline{p})}{\gamma_i}$$

using the first set of beam forming vectors, wherein the first set of downlink transmit powers comprises a first downlink transmit power for the first mobile device and a first downlink transmit power for the second mobile device;

(C) determining a second set of virtual dual uplink transmit powers using the first maximum worst-case SINR margin, wherein the first set of virtual dual uplink transmit powers comprises a first virtual dual uplink transmit power for the first mobile device and a first virtual dual uplink transmit power for the second mobile device;

(D) determining a second set of beam forming vectors using the second set of virtual dual uplink transmit powers, wherein the second set of beam forming vectors comprises a second beam forming vector for the first mobile device and a second beam forming vector for the second mobile device;

(E) determining a second set of downlink transmit powers and a second maximum worst-case SINR margin defined by $$C^{DL} = \max_{U,\underline{p}} \min_{1 \le j \le K} \frac{\text{SINR}_j^{DL}(U,\underline{p})}{\gamma_j}$$

using the second set of beam forming vectors, wherein the second set of downlink transmit powers comprises a second downlink transmit power for the first mobile device and a second downlink transmit power for the second mobile device; and (F) determining whether the maximum worst-case SINR margin has converged using the first maximum worst-case SINR margin and the second maximum worst-case SINR margin.

2. The method of claim 1, wherein the step of determining whether the maximum worst-case SINR margin has converged comprises dividing the second maximum worst-case SINR margin by the first maximum worst-case SINR margin and determining whether the result is less than or equal to a predetermined threshold.

3. The method of claim 1, further comprising:
(G) in response to determining in step (F) that the maximum worst-case SINR margin has converged, then using the second beam forming vector for the first mobile device to transmit the data to the first mobile device.

4. The method of claim 3, further comprising:
(H) in response to determining in step (F) that the maximum worst-case SINR margin has not converged, then:
(i) determining a third set of virtual dual uplink transmit powers using the second maximum worst-case SINR margin;
(ii) determining a third set of beam forming vectors using the third set of virtual dual uplink transmit powers;
(iii) determining a third set of downlink transmit powers and a third maximum worst-case SINR margin using the third set of beam forming vectors; and
(iv) determining whether the maximum worst-case SINR margin has converged using the second maximum worst-case SINR margin and the third maximum worst-case SINR margin.

5. The method of claim 1, wherein the step of determining the first set of downlink transmit powers and the first maximum worst-case signal SINR margin comprises:
(i) assuming that a particular transmission point controlled by the controller transmits at a maximum power allowed under a per-transmitter power constraint (PTPC);
(ii) using the assumption and the first set of beam forming vectors to determine a set of downlink transmit powers;
(iii) using the determined set of downlink transmit powers to determine whether the PTPC is satisfied; and
(iv) setting the first set of downlink transmit powers to the determined set of downlink transmit powers if it is determined that the PTPC is satisfied, otherwise assuming that a different transmission point controlled by the controller transmits at a maximum power allowed under the PTPC and repeating steps (ii)-(iv).

6. The method of claim 5, wherein step (ii) comprises solving Equation 12.

7. The method of claim 1, wherein
the step of determining the first set of beam forming vectors comprises solving Equation 20, and the step of determining the second set of virtual dual uplink transmit powers comprises solving Equation 19.

8. The method of claim 1, wherein steps (A)-(F) are performed periodically while the first mobile terminal is connected to a transmission point controlled by the said controller.

9. The method of claim 1, wherein the step of determining the maximum worst-case SINR margin comprises using a set of predetermined target SINR values to solve Equation 3.

10. The method of claim 1, further comprising:
(G) receiving from a transmission point (1) signal information pertaining to a transmit correlation matrix associated with the first mobile device, (2) the noise information, and (3) the interference information, wherein
the interference information pertains to a transmit correlation matrix of at least one second mobile device, and
the step of determining the first set of beam forming vectors comprises using the signal information, noise information and interference information to determine the first set of beam forming vectors.

11. The method of claim 10, wherein the signal information comprises the transmit correlation matrix or comprises information from which the transmit correlation matrix can be derived.

12. The method of claim 1, wherein the first and second beam forming vectors for the first mobile device are constrained to be zero for all but one transmission point.

13. The method of claim 1, wherein the transmission point comprises a single omni-directional antenna, a single sector antenna or a single antenna array.

14. A controller for determining a beam forming vector for use in transmitting data to a first mobile device connected to a transmission point, comprising:
a transmitter and receiver for communicating with the transmission point;
a data storage system storing software; and
a data processing system for executing the software, wherein the software comprises:
(A) computer instructions for determining a first set of beam forming vectors using a first set of virtual dual uplink transmit powers, wherein the first set of beam forming vectors comprises a first beam forming vector for the first mobile device and a first beam forming vector for a second mobile device;
(B) computer instructions for determining a first set of downlink transmit powers and a first maximum worst-case signal to interference-plus-noise ratio (SINR) margin defined by $$C^{DL} = \max_{U,\underline{p}} \min_{1 \le i \le K} \frac{\text{SINR}_i^{DL}(U,\underline{p})}{\gamma_i}$$

using the first set of beam forming vectors, wherein the first set of downlink transmit powers comprises a first downlink transmit power for the first mobile device and a first downlink transmit power for the second mobile device;
(C) computer instructions for determining a second set of virtual dual uplink transmit powers using the first maximum worst-case SINR margin, wherein the first set of virtual dual uplink transmit powers comprises a first virtual dual uplink transmit power for the first mobile device and a first virtual dual uplink transmit power for the second mobile device;
(D) computer instructions for determining a second set of beam forming vectors using the second set of virtual dual uplink transmit powers, wherein the second set of beam forming vectors comprises a second beam forming vector for the first mobile device and a second beam forming vector for the second mobile device;

(E) computer instructions for determining a second set of downlink transmit powers and a second maximum worst-case SINR margin also defined by $$C^{DL} = \max_{U,p} \min_{1 \le i \le K} \frac{SINR_i^{DL}(U, \underline{p})}{\gamma_i}$$

using the second set of beam forming vectors, wherein the second set of downlink transmit powers comprises a second downlink transmit power for the first mobile device and a second downlink transmit power for the second mobile device; and (F) computer instructions for determining whether the maximum worst-case SINR margin has converged using the first maximum worst-case SINR margin and the second maximum worst-case SINR margin.

15. The controller of claim 14, wherein the computer instructions for determining the first set of beam forming vectors are configured to determine the first set of beam forming vectors using (1) signal information pertaining to a transmit correlation matrix associated with the first mobile device, (2) noise information, and (3) interference information pertaining to a transmit correlation matrix associated with the second mobile device.

16. The controller of claim 14, wherein the computer instructions for determining whether the maximum worst-case SINR margin has converged comprises computer instructions for dividing the second maximum worst-case SINR margin by the first maximum worst-case SINR margin and determining whether the result is less than or equal to a predetermined threshold.

17. The controller of claim 14, wherein the software is configured such that the controller, in response to a determining that the maximum worst-case SINR margin has converged, uses the second beam forming vector for the first mobile device to transmit the data to the first mobile device.

18. The controller of claim 17, wherein the software is configured such that, in response to determining that the maximum worst-case SINR margin has not converged, the controller:
(i) determines a third set of virtual dual uplink transmit powers using the second maximum worst-case SINR margin;
(ii) determines a third set of beam forming vectors using the third set of virtual dual uplink transmit powers;
(iii) determines a third set of downlink transmit powers and a third maximum worst-case SINR margin using the third set of beam forming vectors; and
(iv) determines whether the maximum worst-case SINR margin has converged using the second maximum worst-case SINR margin and the third maximum worst-case SINR margin.

19. The controller of claim 14, wherein the computer instructions for determining the first set of downlink transmit powers and the first maximum worst-case signal SINR margin comprises:
(i) computer instructions for initializing a variable that represents a particular transmission point controlled by the controller that is assumed to transmit at a maximum power allowed under a per-transmitter power constraint (PTPC);
(ii) computer instructions for using the variable and the first set of beam forming vectors to determine a set of downlink transmit powers;
(iii) computer instructions for determining whether the PTPC is satisfied using the determined set of downlink transmit powers; and
(iv) computer instructions for setting the first set of downlink transmit powers to the determined set of downlink transmit powers if it is determined that the PTPC is satisfied, otherwise modifying the variable so that the variable represents another transmission point controlled by the controller and repeating steps (ii)-(iv).

20. The controller of claim 19, wherein the computer instructions for using the variable and the first set of beam forming vectors to determine the set of downlink transmit powers comprises computer instructions for solving Equation 12.

21. The controller of claim 14, wherein
the computer instructions for determining the first set of beam forming vectors comprises computer instructions for solving Equation 20, and
the computer instructions for determining the first set of virtual dual uplink transmit powers comprises computer instructions for solving Equation 19.

22. The controller of claim 14, wherein the computer instructions for determining the maximum worst-case SINR margin comprises computer instructions for solving Equation 3 using a set of predetermined target SINR values.

23. The controller of claim 14, wherein the first and second beam forming vectors for the first mobile device are constrained to be zero for all but one transmission point.

* * * * *

UNITED STATES PATENT AND TRADEMARK OFFICE
CERTIFICATE OF CORRECTION

PATENT NO. : 8,358,631 B2
APPLICATION NO. : 12/406489
DATED : January 22, 2013
INVENTOR(S) : Hafeez Page 1 of 1

It is certified that error appears in the above-identified patent and that said Letters Patent is hereby corrected as shown below:

On the Title Page, in Field (56), under "OTHER PUBLICATIONS", in Column 1, Line 1, delete "et al," and insert -- et al., --, therefor.

On the Title Page, in Field (56), under "OTHER PUBLICATIONS", in Column 1, Line 2, delete "Contraints," and insert -- Constraints, --, therefor.

In the Specifications:

In Column 3, Line 23, delete "has," and insert -- has --, therefor.

In Column 3, Line 65, delete "an" and insert -- a --, therefor.

In Column 4, Line 53, delete "invention" and insert -- invention. --, therefor.

In Column 6, Line 65, delete "$1_{n_0}$" and insert -- $1^T_{n_0}$ --, therefor.

In Column 7, Line 36, delete "{1, 2, ... N}" and insert -- {1, 2, ... N}, --, therefor.

In Column 10, Line 2, delete "30C" and insert -- 300 --, therefor.

Signed and Sealed this
Sixteenth Day of April, 2013

Teresa Stanek Rea
*Acting Director of the United States Patent and Trademark Office*